Dec. 11, 1962 T. F. TRIBE 3,068,347
SHEARING AND WELDING MACHINE
Filed June 2, 1960 5 Sheets-Sheet 1

Inventor:
Thomas Francis Tribe
By Kenyon, Palmer & Stewart
Attorneys

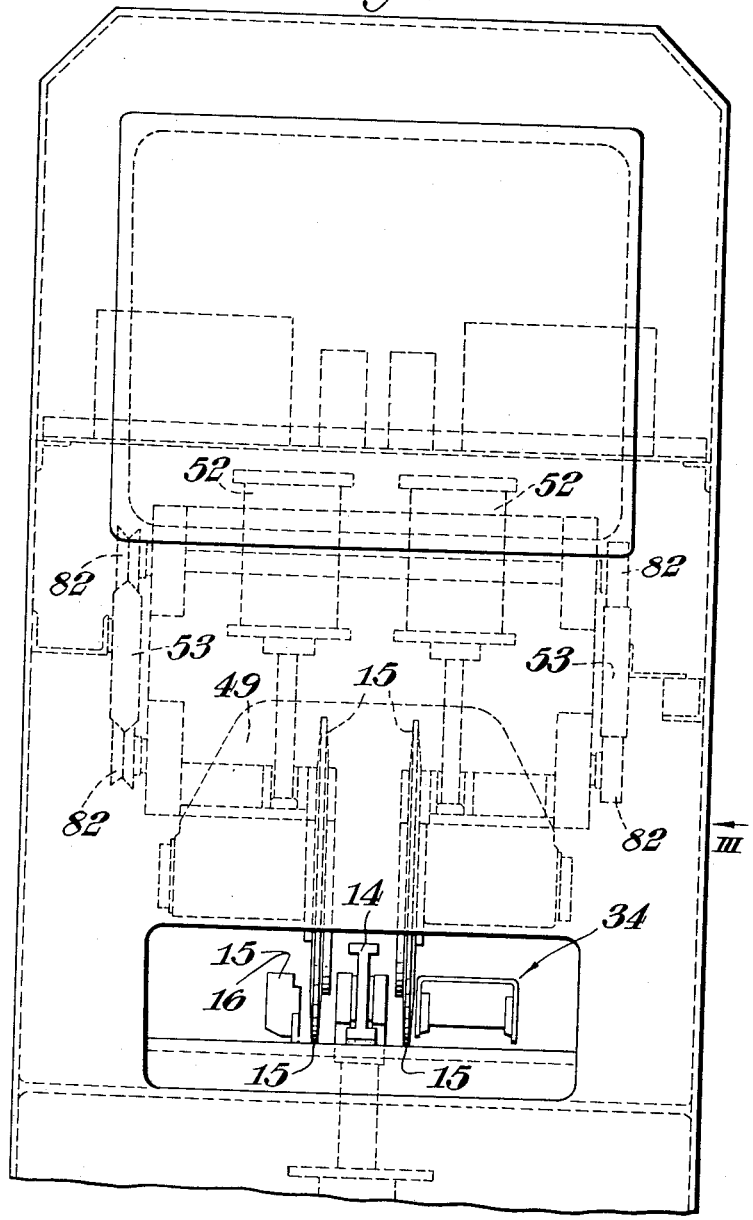

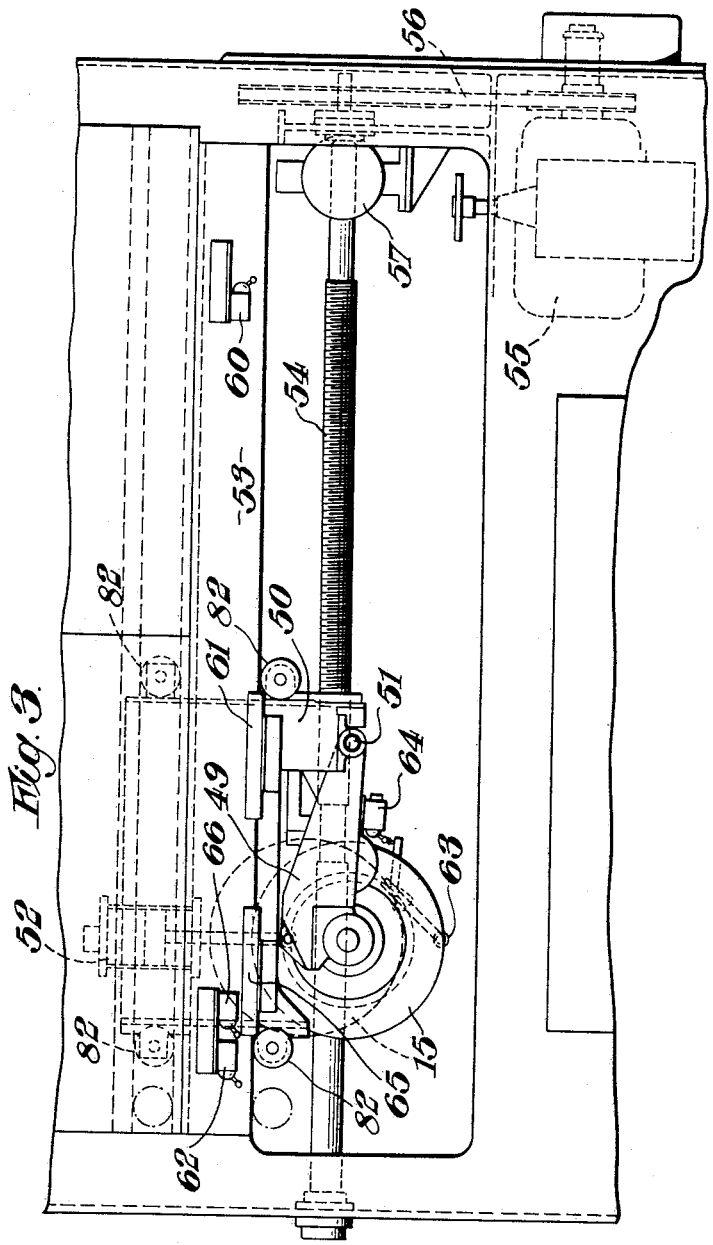

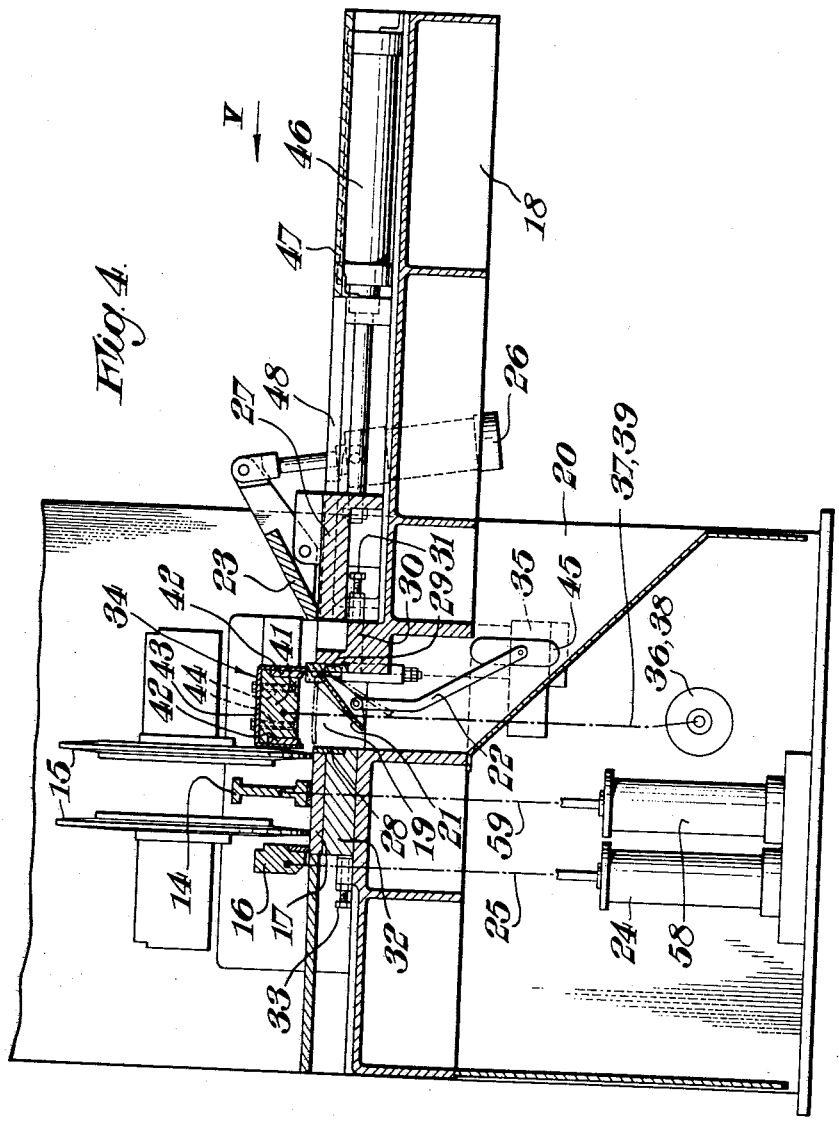

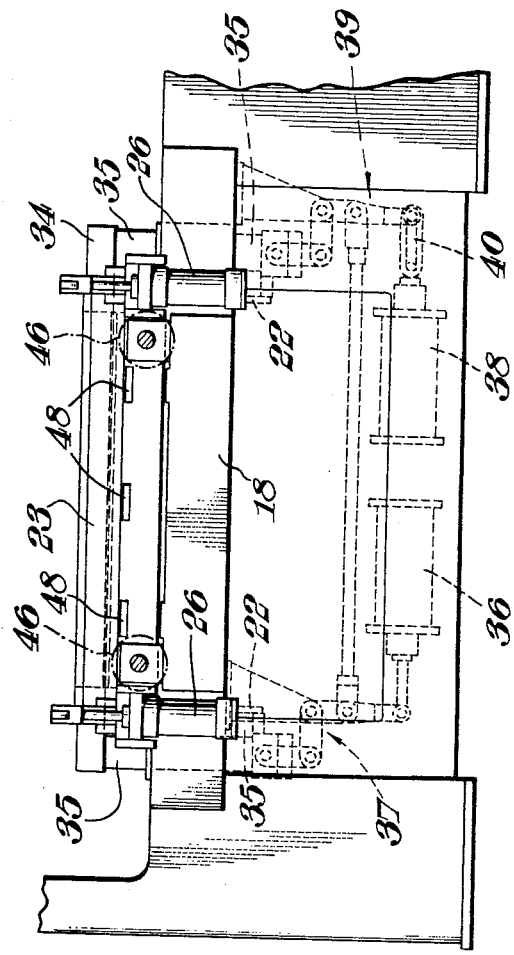

United States Patent Office 3,068,347
Patented Dec. 11, 1962

3,068,347
SHEARING AND WELDING MACHINE
Thomas Francis Tribe, Dubley, England, assignor of a part interest to British Federal Welder and Machine Company Limited
Filed June 2, 1960, Ser. No. 33,573
Claims priority, application Great Britain June 3, 1959
2 Claims. (Cl. 219—82)

This invention relates to machines for shearing and welding sheet metal strip, produced for example in a continuous strip mill, and whilst it is particularly adaptable to the shearing and seam welding of strip for subsequent tinning it is equally applicable to the seam welding of plain strip and to flash and mash welding of all sheet metal strip.

According to the invention sheet strip is fed from a roll to a shearing station, where its leading edge, simultaneously with the trailing edge of a previously fed strip is accurately sheared, the trailing edge is then retained by a clamp and the succeeding strip automatically fed forward to a welding station at which its leading margin engages or overlaps the trailing margin of the preceding strip, in which position a welding machine is automatically moved into position to weld the two sheets together.

The shearing station and welding station are arranged the one closely ahead of the other in the direction of feed of the strip.

After welding the strip passes through a looping pit, to enable the shearing and welding operations to continue without interruption.

The joint between the trailing and leading edges of successive strips may be effected by one or two lines of seam welding, suitable welding rollers being moved automatically, after the shearing operation, to engage the strips and traverse thereacross. Alternatively the joint may be made by flash welding or by spot resistance welding.

A machine according to this invention is illustrated in the accompanying drawings whereof:

FIG. 2 is a view of the machine similar to FIG. 1 and to a larger size,

FIG. 3 is a view in the direction of the arrow III of FIG. 2 showing part only of the machine, FIG. 4 is a view (partly in section) of the mean features of the machine, and FIG. 5 is a view in the direction of the arrow V of FIG. 4.

Figure 1:
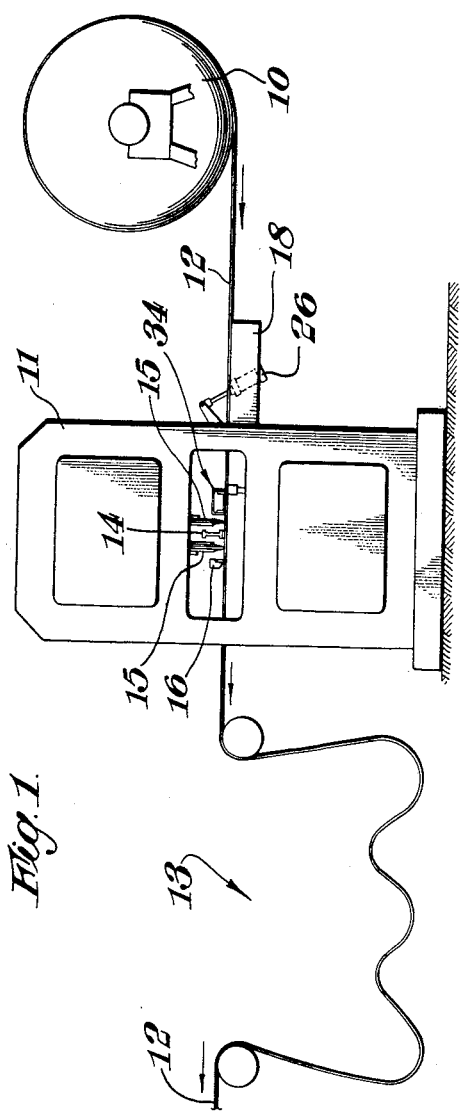
FIG. 1 is a schematic view of the machine and the related mechanisms.

Referring to FIG. 1. A roll 10 of sheet metal strip 12 supplies the shearing and welding machine 11 from which the strip 12 passes to a looping pit (diagrammatically indicated at 13). In the machine 11 the trailing edge of a previous strip (i.e. a strip on the looping pit side of the machine) and the leading edge of the succeeding strip (i.e. from roll 10) are held overlapped by a clamp 14 while a pair of welding rollers 15 are traversed across the strips and a pair of seam welds are thereby completed. The clamp and welding rollers are then raised to release the strip which then passes in uninterrupted manner from the roll 10 to the looping pit 13 and thence on its way.

Referring now to FIG. 4. The tail end of the previous strip is held by a clamp 16 upon a copper pad 17 supported by a table 18 secured to the frame of machine 11. The tail extends from the clamp 16 into the shearing gap 19 above a chute 20. The gap is closed by a plate 21 which is actuated by levers 22 to open the gap as later described.

The leading end of the next or succeeding strip passes from roll 10 above the table 18 and beneath a clamp 23.

The clamp holds the strip to a platform 27 with the leading edge above gap 19, the platform being on table 18.

Clamp 16 is actuated by a pneumatic or hydraulic ram 24 which is coupled to the clamp, as diagrammatically indicated at 25. Clamp 23 is actuated by ram 26.

The shear gap 19 is defined by opposite, parallel stationary blades 28, 29 of which blade 29 is carried by a holder 30 that is adjustable by screws 31. Blade 28 is secured to a holder 32 which is adjustable by screws 33, the pad 17 being mounted on holder 32.

A movable pressure pad and shearing bar assembly 34 is above the gap 19. Assembly 34 is carried by pillars 35, one at each end of the assembly, and one pillar is coupled with a pneumatic or hydraulic ram 36 by linkage 37 while the other end is coupled to ram 38 by linkage 39. Linkage 39 incorporates a lost motion 40. Linkage 37 does not do so (FIG. 5).

Assembly 34 comprises a body 41 carrying shear blades 42 and a channel section pressure pad 43 which is urged by springs 44 to project below blades 42. The vertical limbs of pad 43 engage the tops of blades 28, 29 and clamp the tail and leading ends thereto. Thus when assembly 34 is lowered by rams 36, 38 the strips are first held by pad 43 and then blades 28, 42 and 29, 42 co-act to shear the ends of the strips. The levers 22 are coupled to pillars 35 (at 45) so that the scrap is discharged into chute 20.

Both rams 36, 38 are operative to lower assembly 34 while only ram 36 is operative initially to raise the assembly—the lost motion 40 permitting this.

During shearing clamp 23 continues to hold the leading end of the succeeding strip to the platform 27.

Clamp 23 is pivotally mounted on platform 27 and rams 26 are carried thereby. The platform is mounted on table 18 for sliding movement towards and away from gap 19, being actuated by rams 46 carried by table 18. The top platform 27, a plate 47 and bars 48, carried by plate 47 to slide in slots in the upper surface of platform 27, are all in the same horizontal plane.

When clamp 23 is actuated as described above platform 27 is in its extreme right-hand position as seen in FIG. 4. After shearing (assembly 34 having been raised) rams 46 move platform 27 and clamp 23 to the left (to the position shown in FIG. 4) thereby advancing the leading end of the clamped strip until the leading edge abuts the side of clamp 16. During this the parts 14, 16 are raised above pad 17.

The wheels 15 are mounted in a headstock 49 (FIG. 2) which is supported by a carriage 50 by pivot 51 (FIG. 3) for vertical movement. Pneumatic rams 52 are coupled to headstock 49 to raise wheels 15. Carriage 50 is mounted for horizontal movement on wheels 82 which run on fixed slides 53. A threaded spindle 54 engages carriage 50, the spindle being driven by an electric motor 55 through a belt drive 56. An electrically operated brake 57 is provided.

Referring again to FIG. 4. The clamp 14 is coupled (as diagrammatically indicated at 59) to a ram 58.

When platform 27 is advanced as described the leading end is brought to overlap the trailing end of the previous strip and in this position clamp 14 is lowered. This holds the overlapped ends against copper pad or block 17. Wheels 17 serve as one welding electrode and block 17 as another and it is arranged that welding current is switched on and the carriage 50 is traversed with the wheels in engagement with the overlapped strips. A pair of spaced seam welds are thus completed.

Each of the rams 24, 26, 36, 46, 52 and 58 also actuates an electric switch (not shown) of a control system provided to ensure that the sequence of operations is automatically performed when a master control is operated. The master control brings cylinder 24 into operation to lower clamp 16. When this has been done ram 24 actuates its electric switch which brings ram 26 into operation. When clamp 23 has been lowered ram 26 actuates its electric switch to bring rams 36, 38 into operation which in term bring rams 46 into operation which finally bring rams 50 and 52 into operation. Now rams 52 actuate a switch which starts motor 55 so that carriage 50 is traversed. When fully traversed switch 60 (FIG. 3) is actuated by bar 61 to reverse the motor. Limit switch 62 (actuated by bar 65) stops the motor.

When carriage 50 commences to traverse (wheels 16 having previously been lowered) they are to the side of the overlapped strips and are not in engagement with them. When traverse commences switch 66 is actuated to complete the welding circuit conditional upon switch 64 being closed. A roller 63 (FIG. 3) engages the strips on traverse of carriage 50 to actuate switch 64 to maintain the welding circuit while wheels 16 are in engagement with the strips. Switch 64 ensures that as the carriage 50 is returned the welding circuit can not be completed because headstock 49 is then raised immobilising switch 64.

By arranging the shearing and welding stations in close proximity, the minimum movement of a following strip is required from the shearing to the welding position, and the same members, e.g. clamps, may be used in both operations so that a great saving in time is obtained together with a simpler and more economical construction of machine, thus ensuring an overall economy of production, time saving and the dispensation of hand operation.

I claim:

1. A machine for shearing a pair of sheet metal strips, overlapping the strips and for welding together the overlapped strips comprising a frame, a welding head mounted on the frame for traversing movement across the strips at a welding station fixed in the lengthwise direction of the strips, power means for moving the welding head across the strips, a stationary clamping means on one side of the welding station in said lengthwise direction for holding a leading one of the pair of strips during shearing, overlapping and welding, another clamping means on the other side of the welding station for holding a trailing one of the pair of strips during shearing, overlapping and welding, a movable carrier for said other clamping means supported from the frame for movement in said lengthwise direction, an actuator for moving said carrier and a shearing device disposed in fixed position between the welding station and said movable clamping means in said lengthwise direction for simultaneously shearing the ends of both strips the actuator moving said movable clamping means to overlap at said weld station the sheared end of the trailing strip clamped by said movable clamping means upon the sheared end of the leading strip held by the stationary clamping means prior to the welding head moving across such overlapped ends to weld them together.

2. A machine for shearing a pair of sheet metal strips, overlapping the strips and for welding together the overlapped strips comprising a frame, a welding head mounted on the frame for traversing movement across the strips at a welding station, at least one welding wheel comprised with said welding head, power means to move said welding head and wheel across the strip, a stationary clamping means to one side of said welding station in the lengthwise direction of the strips to hold a leading one of the pair of strips during shearing, overlapping and welding, another clamping means to the other side of said welding station to hold a trailing one of the pair of strips during shearing, overlapping and welding, a movable carrier for said other clamping means supported from the frame for movement in said lengthwise direction, an actuator to move said carrier, two pairs of shearing blades spaced apart in said lengthwise direction between said welding station and said movable clamping means to simultaneously shear the adjacent ends of both strips, one of said pairs of blades being located immediately at the side of the path of said welding wheel, and a pressure pad housing movable blades of said two pairs of blades and presenting edges to clamp the adjacent ends of the two strips onto stationary blades of said two pairs of blades during shearing, said actuator moving said movable clamping means to overlap the sheared end of the trailing strip clamped thereby upon the sheared end of the leading strip held by said stationary clamping means prior to said welding head and wheel moving across such overlapped ends to weld them together.

References Cited in the file of this patent

UNITED STATES PATENTS

| | | |
|---|---|---|
| 2,143,969 | Biggert | Jan. 17, 1939 |
| 2,369,830 | Johnson et al. | Feb. 20, 1945 |
| 2,412,648 | Rendel | Dec. 17, 1946 |
| 2,634,353 | Geiszler et al. | Apr. 7, 1953 |
| 2,663,784 | Iversen | Dec. 22, 1953 |
| 2,911,515 | Cooper | Nov. 3, 1959 |
| 2,957,071 | Cooper et al. | Oct. 18, 1960 |
| 2,970,206 | Uhrain | Jan. 31, 1961 |
| 3,017,495 | Woodward | Jan. 16, 1962 |